(12) United States Patent
Morasch et al.

(10) Patent No.: US 8,220,124 B1
(45) Date of Patent: *Jul. 17, 2012

(54) RESTORATION PROCESS FOR POROSITY DEFECTS IN METAL CAST PRODUCTS

(75) Inventors: Kevin Morasch, Oshkosh, WI (US); Douglas M. Woehlke, Fond du Lac, WI (US); Kevin R. Anderson, Fond du Lac, WI (US); Raymond J. Donahue, Fond du Lac, WI (US)

(73) Assignee: Brunswick Corporation, Lake Forest, IL (US)

(*) Notice: Subject to any disclaimer, the term of this patent is extended or adjusted under 35 U.S.C. 154(b) by 1002 days.

This patent is subject to a terminal disclaimer.

(21) Appl. No.: 12/194,096

(22) Filed: Aug. 19, 2008

Related U.S. Application Data

(63) Continuation-in-part of application No. 11/638,544, filed on Dec. 13, 2006, now Pat. No. 7,712,216, which is a continuation of application No. 10/358,480, filed on Feb. 5, 2003, now Pat. No. 7,188,416.

(51) Int. Cl.
*B23P 6/00* (2006.01)

(52) U.S. Cl. .......... 29/402.09; 29/402.16; 427/142; 427/287

(58) Field of Classification Search .......... 29/402.09, 29/402.16; 427/142, 287
See application file for complete search history.

(56) References Cited

U.S. PATENT DOCUMENTS

| | | | |
|---|---|---|---|
| 2,588,421 A | 3/1952 | Shepard | |
| 4,273,808 A * | 6/1981 | Neirynck et al. | 427/142 |
| 4,878,953 A | 11/1989 | Saltzman et al. | |
| 4,960,611 A * | 10/1990 | Fujisawa et al. | 427/504 |
| 5,071,054 A | 12/1991 | Dzugan et al. | |
| 5,626,674 A | 5/1997 | VanKuiken et al. | |
| 5,766,693 A | 6/1998 | Rao | |
| 5,806,751 A * | 9/1998 | Schaefer et al. | 228/119 |
| 5,997,941 A * | 12/1999 | Dannenhauer et al. | 427/140 |
| 6,049,978 A | 4/2000 | Arnold | |
| 6,060,117 A | 5/2000 | Pergande et al. | |
| 6,214,411 B1 * | 4/2001 | Graefenhain-Thoma et al. | 427/142 |
| 6,312,765 B1 * | 11/2001 | Ueno | 427/510 |
| 6,395,090 B1 | 5/2002 | Shepley et al. | |
| 7,188,416 B1 | 3/2007 | Woehlke et al. | |
| 7,712,216 B1 * | 5/2010 | Woehlke et al. | 29/888.011 |
| 2003/0088980 A1 | 5/2003 | Arnold | |

FOREIGN PATENT DOCUMENTS

| | | |
|---|---|---|
| DE | 2613669 | 10/1997 |
| JP | 09-019757 | 1/1997 |
| JP | 11-158598 | 6/1999 |
| JP | 2002-309999 | 10/2002 |

* cited by examiner

*Primary Examiner* — Carl Arbes
(74) *Attorney, Agent, or Firm* — Andrus, Sceales, Starke & Sawall, LLP

(57) ABSTRACT

A restoration process for restoring surface porosity defects on a component surface. The areas of a component surface having surface porosity defects are identified for restoration. The restoration surface is subsequently sprayed with a restoration spray to restore the surface porosity defects. The component surface is then finished to create a final component substantially free of surface porosity.

26 Claims, 2 Drawing Sheets

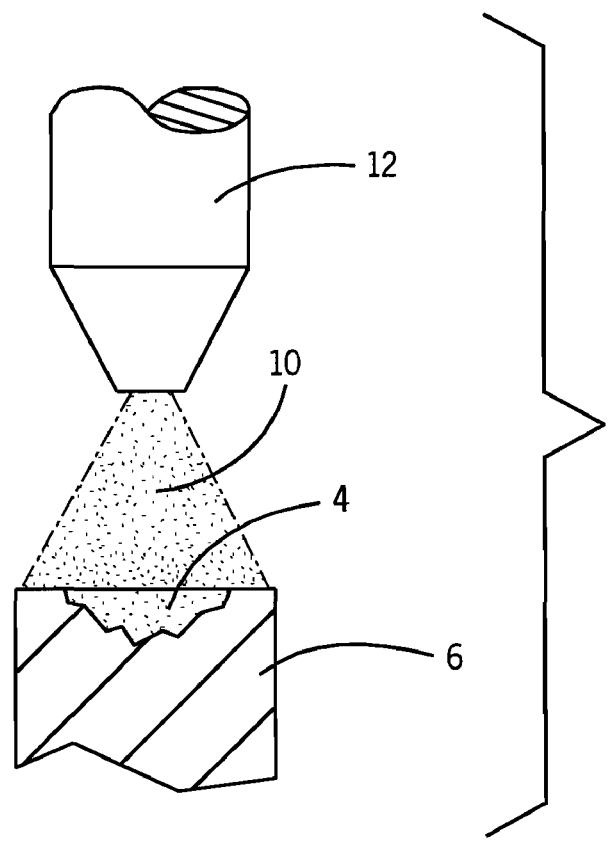
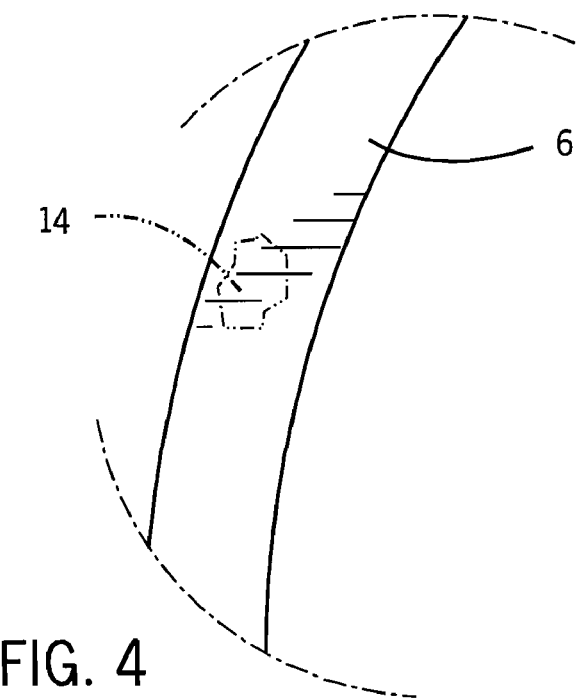
FIG. 3
FIG. 4

RESTORATION PROCESS FOR POROSITY DEFECTS IN METAL CAST PRODUCTS

CROSS-REFERENCE TO RELATED APPLICATION

This application is a continuation-in-part of U.S. patent application Ser. No. 11/638,544, filed Dec. 13, 2006, which is a continuation of U.S. patent application Ser. No. 10/358,480, filed Feb. 5, 2003, now U.S. Pat. No. 7,188,416.

BACKGROUND AND SUMMARY OF THE INVENTION

Lost foam casting of products is well known in the casting industry. However, the lost foam casting process sometimes results in surface porosities on cast parts. Surface porosity defects are also present in sand casting, die casting and permanent mold casting processes. This porosity causes failures for many parts, particularly for parts that require sealing on a surface containing such porosity, because the porosity causes leaks around the seals. As a result, many cast products are rejected and scrapped for quality considerations.

Surprisingly, it has been found that the surface porosity problem may be remedied by a highly efficient restoration process that eliminates surface porosity on an exposed surface. The restoration process of the present application allows for the restoration of parts that would otherwise be scrapped creating a strong economic advantage. The process of the present application is also superior to the restoration processes that currently defines the state of the art.

In the current state of the art, surface porosity repair is achieved through the use of polymer matrix repair putty such as Devcon®, or the like. This approach to the repair of surface porosities is termed the "putty solution." The disadvantage of the use of polymer matrix repair putty is that it may not be used on surface porosity smaller than 0.080 inches in diameter. As proper O-ring sealing requires elimination of surface porosities as small as 0.010 inches in diameter, the putty solution is an imperfect restoration process.

In order to remedy the deficiencies in the putty solution, surface porosities between 0.010 inches and 0.080 inches are drilled out so that they reach the 0.080 inch requirement and are subsequently filled with the polymer matrix repair putty. Still, the solution is imperfect as the drilling increases the surface porosity before the Devcon® repair putty is able to effectively fill the porosity with a sufficient bonding patch. The drilling step also requires the use of additional resources making the process less efficient. Additionally, the patch is not aesthetically pleasing to consumers and may convey a message that the blocks are substandard. Further, although long term life of polymer matrix repair putty patches themselves are presumed acceptable, it does decrease heat transfer locally and the long term interaction with the aluminum interfaces are in question.

Another drawback of the putty solution is that manufacturing restrictions only allow three polymer matrix repair putty patches per engine block. The putty solution further complicates plant productivity efficiencies insofar as the putty requires curing for 24 hours before final finishing of the engine block surface. Therefore, a combination of the high pressure die cast process along with the putty solution requires a significant queue for an engine block line that requires continuous seven day production to keep up with a five day demand.

An additional secondary operation utilized in the current state of the art is the use of a metal soldering patch in replacement of the polymer matrix repair putty. This "soldering solution" requires the application of a low melting point alloy on top of the identified surface porosity. Conceptually, this solution has three main advantages: 1) the patch would not be visible after cleanup; 2) it could be utilized on more than three repair sites per engine block head deck; and 3) it would not require any curing time between application and finishing, thus eliminating the need for a queue of blocks.

However, the soldering solution has a major drawback in that a Galvanic couple exists between the dissimilar base metal and soldering patch. The Galvanic couple is problematic when it comes into contact with salt water, because salt water corrodes the soldering patch. As many of the products produced by the Applicant are for marine applications, and specifically for salt water marine applications, such a problem is quite disadvantageous. Further, the soldering solution requires a heat input to the engine block surface which may result in heat distortion defects, discoloration, and overaging of the precipitation strengthened cast product.

As a result of the concerns about the putty solution as well as the soldering solution, alternative solutions have been explored. Surprisingly, the restoration process of the present application captures the three noted advantages of the soldering solution without having a bonding problem, a Galvanic corrosion problem, nor a heat input problem. This novel restoration process efficiently and economically restores for use cast part surfaces having surface porosity defects. The restoration process of the present application eliminates surface porosity defects using a spray filler. In one embodiment, the spray filler is significantly different in composition from the substrate material. In other embodiments, the filler and substrate material are the same or similar. Further, with the present application, there is no need to make smaller porosity defects "bigger" for applying the repair spray nor is there a limit to the number or size of porosity defects that may be repaired. Further, there is no heat distortion imparted to the engine blocks nor do Galvonic corrosion concerns exist.

As a result of these advantages, there is significantly less scrapping of cast products, resulting in a much more efficient production process. The restoration process of the present application also does not require any waiting or curing time between the application of the restoration process and the final finishing of the block. Thus, no production queue is needed and level loading of the blocks may be planned through the production and machining process, further increasing the efficiency of production compared to the putty solution or the soldering solution. Finally, the aesthetic problem associated with the putty solution is eliminated as repaired porosity defects are not visible after clean up.

Metal spraying of ceramic materials for wear resistance has been commercialized in the enhancement of crank pin journals, as well as in metal spraying of complete cylinder bores. However, neither of the above stated uses of metal spraying have been contemplated for the restoration of surface porosity defects.

Crank pin journals are defined as the area where a connecting rod attaches to a crankshaft in an engine. The use of metal spray enhances the durability of crank pen journals to wear by building up the area of attachment. Similarly, the aircraft industry has used metal spraying of complete cylinder bores to produce a coating that reduces wear problems.

With the metal spraying being utilized to create a wear surface, the noted processes require a large capitalized systems approach. This is significantly different from the restoration of miniscule surface porosity defects to allow the use of the high pressure die casting process. Further, the process of the current invention is also quite different from any "rapid prototyping" process that builds entire articles, for the same reasons already cited. The use of this micro-area, restoration process to add value to the high pressure die cast process therefore is a new and significantly useful addition to the state of the art.

Accordingly, the present application provides a restoration process for repairing surface porosity defects in a cast component. The process comprises the steps of: identifying an area on a component surface containing at least one porosity defect resulting from the casting process, the area defining a restoration area; applying a restoration spray to the restoration area; and finishing the restoration area. In one embodiment, the component surface and the restoration spray comprise distinct compositions. For example, the component surface may comprise a metallic substrate and the restoration spray may comprise a separate, distinct metallic filler. As a further example, the component surface may comprise a metallic substrate and the restoration spray may comprise a polymeric filler. As a further example, the component surface may comprise a polymeric substrate, and the restoration spray may comprise a metallic filler. By way of further example, the component surface may comprise a polymeric substrate, and the restoration spray comprise a different polymeric filler. By way of further example, the component surface may be a cast iron surface, and the restoration spray may comprise a nickel alloy. The cast component may be cast utilizing a lost foam casting process, a sand casting process, a die casting process or a permanent mold casting process. In one embodiment, the step of applying the restoration spray comprises applying the spray with a spray gun. In another embodiment, the step of finishing the restoration area further comprises removing excess restoration spray material.

The present application also contemplates a restoration process for preparing surface porosity defects on a sealing surface requiring a zero porosity tolerance. The process comprises the steps of identifying an area on a sealing surface containing at least one porosity defect, this area defining a restoration area; applying a restoration spray to the restoration area; and finishing the restoration area. In one embodiment, the sealing surface comprises a metallic substrate and the restoration spray comprises a separate, distinct metallic filler. In another embodiment, the sealing surface comprises a metallic substrate and the restoration spray comprises a polymeric filler. In another embodiment, the sealing surface comprises a polymeric substrate and the restoration spray comprises a polymeric filler. In yet another embodiment, the sealing surface comprises a polymeric substrate and the restoration spray comprises a metallic filler. In one example of this process, the sealing surface is cast iron and the restoration spray comprises a nickel alloy filler. The step of finishing the restoration area, in one embodiment, further comprises a moving access restoration spray material. In yet another embodiment, the process inflates a sealing surface that is a mating surface requiring use of a gasket.

BRIEF DESCRIPTION OF THE DRAWINGS

The drawings illustrate the best mode presently contemplated of carrying out the invention.

In the drawings:

FIG. 3 is a side view 4 demonstrating the application of a restoration spray to a surface porosity defect.

FIG. 4 is a magnified view similar to FIG. 2 illustrating a cylinder bore having a restored surface porosity defect.

DETAILED DESCRIPTION OF THE PREFERRED EMBODIMENT

Figure 1:
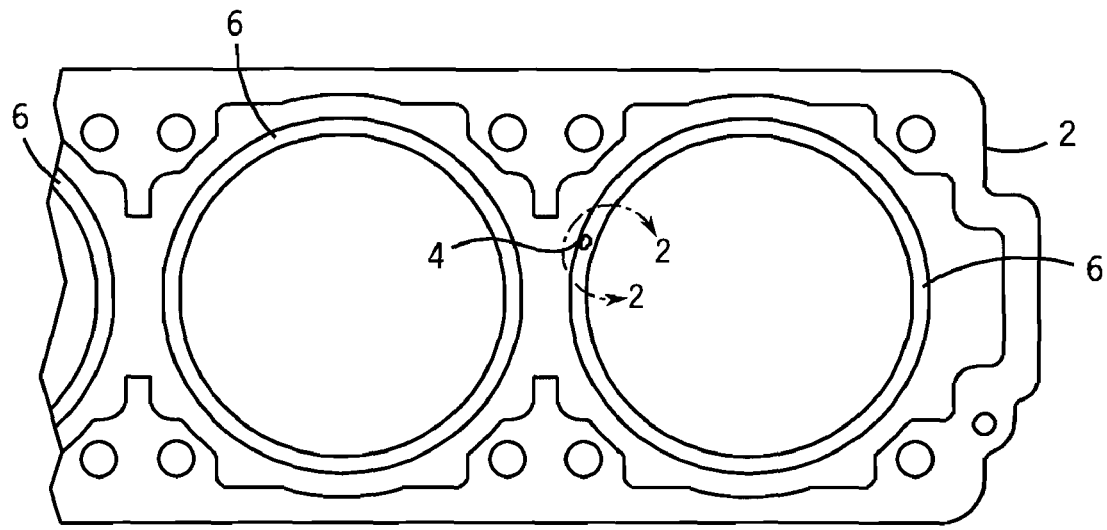
FIG. 1 is a partial top view of an exemplary component surface having surface porosity defects.
Figure 2:
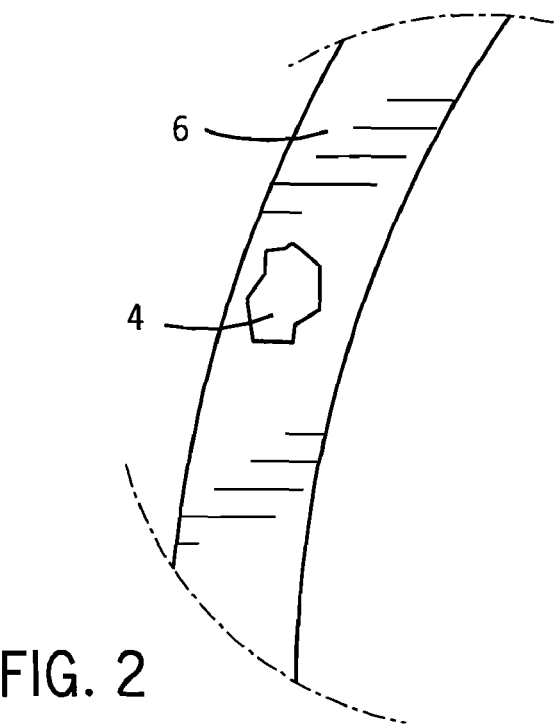
FIG. 2 is a magnified view of the component surface of FIG. 1 demonstrating a surface porosity defect and taken along line 2-2 of FIG. 1.

A restoration process for repairing surface porosity defects on a surface of a cast component or on a sealing surface is described below. Referring to FIG. 1, a component 2 may be cast using the lost foam casting method. The lost foam method is used to cast a variety of complex shapes, such as a hydraulic manifold casting, but sometimes yields a number of surface porosity defects in the final cast article. However, other casting processes also yield surface porosity defects, including die casting, sand casting and permanent mold casting; therefore, the present application may be used for any type of cast product.

Surface porosity defects may be revealed when the component 2 is machined subsequent to casting. Surface porosity defects 4 often result from the entrapment of air at the molten metal front during the lost foam casting process. However, as mentioned, surface porosity defects may also be present in other casting processes resulting from e.g., precipitation of hydrogen during cooling, inadequate feeding, or shrinkage of the casting during cooling.

Surface porosity defects 4 are particularly undesirable on or in component surfaces, and are particularly undesirable on component surfaces that comprise sealing surfaces. Such defects may cause leakage along seals with mating surfaces or gaskets, causing the component to fail during use. Additionally, the manufacture of boat hulls from glass reinforced polyester or vinylester resin often results in entrapment of air bubbles in the final cast product that weaken the final structural integrity of the hull.

Once the surface porosity defects 4 are located and identified, the surface 6 may be immediately restored using the spray restoration process disclosed herein. No preparation of the pore or of the surface is necessary, particularly when the surface is machined to expose the porosity defects.

However, in some embodiments of the process, it may be advantageous to clean the surface 6 prior to restoration. Cleaning may be done by placing the engine block in a blasting cabinet. The blasting cabinet cleans the surface porosity defect 4 using a grit blasting method, such as aluminum oxide grit blasting, or the like. The grit blasting removes excess debris in the surface porosity defect 4, leaving the defect 4 in proper condition for restoration. The blasting cabinet utilized may be a Zero brand blasting product available from Clemco Industries Corporation of Washington, Md., or it may be comparable to such a device. The grit blasting process is cycled according to the specifications of the blasting cabinet. After the engine block 2 and surface porosity defects 4 are cleaned, the engine block 2 is removed from the blasting cabinet. Also, bead blasting may be used to clean and prepare the surface 6 prior to restoration.

Referring now to FIG. 3, after the surface porosity defect 4 is identified, a restoration spray 10 is applied to restore the surface porosity defect 4. The restoration spray 10 is applied using a spray gun 12 containing the restoration spray 10 in one embodiment. The restoration spray 10 may be of the same nature as the surface to be restored. However, in several embodiments, the component surface 6 and the restoration spray comprise distinct compositions.

In one embodiment, the component surface comprises a metallic substrate, such as cast iron, and the restoration spray comprises a metallic filler, such as a nickel alloy comprising 95% nickel, 2-5% aluminum and 1-3% molybdenum. In another embodiment, the component surface comprises a metallic substrate, while the restoration spray comprises a polymeric filler. In another embodiment, the component surface comprises a polymeric substrate and the restoration spray comprises a metallic filler. In another embodiment, the component surface comprises a polymeric substrate and the restoration spray comprises a polymeric filler.

Several combinations of substrates and fillers are contemplated. Metallic substrates that are contemplated as being within the scope of the invention include, but are not limited to: cast iron, steel, aluminum alloys, brass and bronze. Some metallic spray fillers that are contemplated as being within the scope of the invention include, but are not limited to: nickel alloys and copper alloys, particularly alloys based on the Ni-cu binary system. Many polymeric substrates are contemplated as being within the scope of the present application and examples include, but are not limited to: glass reinforced polyester resins and vinyl ester resins. Some following polymeric fillers that are contemplated as being within the scope of the present application include, but are not limited to: thermoplastic fillers and nylon fillers. It is contemplated that many different types of thermoplastic fillers may be used in accordance with the present application, particularly those fillers that re-melt and solidify without degrading properties. Acceptable thermoplastic and nylon fillers include polyamide 6/6, and polyamide 6, and polyphthalamide, all available from DuPont, E.I. duPont de Nemours and Co. of Wilmington, Del.

A spray gun that may be used in one embodiment of the process of the current application is available from Praxair, Inc. of Danbury, Conn. The Praxair thermo spray systems for applying restoration spray utilize Praxair thermal spray wires as the source for the restoration spray. The spray gun heats the wires to an appropriate temperature and then sprays the restoration material or filler at an elevated temperature in order to provide a strong bond between the substrate material (such as a component surface 6) and the restoration spray 10. Other spray systems are also contemplated as being within the scope of the present application. For example, and without limitation, an oxyacetylene spray gun may be used for the spray application of thermoplastic materials.

After applying the restoration filler spray 10 to the component surface 6, the restoration spray 10 is allowed to set for a short period of time so that it has sufficiently hardened. After hardening, the restored surface porosity defect 14 may be finished. The finishing step involves removing any excess material from the component surface 6, and may be accomplished through traditional machining methods or may be done using an abrasive manual finishing tool. The manual abrasive finishing tool may be a file, abrasive paper or a similar tool. The restored surface porosity defect 14 is finished in a manner such that the component surface 6 is indistinguishable from the other parts of the component surface 6, as demonstrated in FIG. 4. This finishing step is important in instances where the component surface 6 comprises a sealing surface, because any derivation along such surface may result in seal failure.

The current process allows for the manufacturing of sealing surfaces having less than 0.05% of surface porosity which meets a proscribed "zero porosity standard." Further, the process of the present invention may be used in many applications requiring the restoration of surface porosity defects. For example, the process may be used in the restoration of surface porosity defects in engine blocks are formed from any number of Aluminum Association alloys including, but not limited to, Aluminum Association alloy Nos.: 360, 361, 364, 369, 380, 383, 384, 385, 390, 391 and 392. Additionally, such engine blocks may be formed from Mercalloy XK 360.

Further, the process of the present application may be used to restore a surface between a combustion chamber and a water cooling chamber of an engine block comprised of the above mentioned materials having surface porosity defects greater than 0.0080 inches in diameter. Such restoration allows the proper O-ring sealing between the combustion chamber and water cooling chamber in accordance with industry standards. Additionally, the process of the current invention may be utilized to produce a surface that allows for chrome plating of the cylinder bores and may also be used to produce cylinder bores being sufficiently free of surface porosity defects such that a four stroke engine block manufactured by the current process uses less than one quart of oil per every 6,000 miles. An additional application is discussed in the following example.

EXPERIMENTAL RESULTS

Applicants applied the process of the current application in the production of a hydraulic manifold casting. This component undergoes a series of leak tests and has a tight specification for porosity; particularly, the specification states that there is a "zero tolerance" for porosity along the machining datum A sealing surface. This surface is a mating surface that requires the use of a gasket. Prior to the invention of the current application, there has been a high scrap rate due to porosity that is revealed during the machining operation after casting. The technology of the present application increased the over-all yield of parts and recaptured the costs associated with scrapping the part.

The hydraulic manifold castings were produced through the lost foam casting process and were cast using G3000 cast iron. Cast components were initially tested for leaking and components that passed leak testing then were subjected to rough and final machining. During the machining operation, the cast components were inspected to determine if porosity was uncovered on the datum A machined surface. The porosity was then visually inspected. A sample set of parts that passed the initial leak testing, but later exhibited porosity, were subjected to the process of the present application. A nickel alloy spray filler was used for restoration. The restoration areas were machined flat and cross sections were made to examine the adhesion of the weld to the base material.

The restoration process restored a total of nine cast components in this trial. The castings were chosen based off of three criteria. The porosity had to be located on the machining datum A surface. The porosity had to be entirely contained with in the walls of the casting (not on the edge/corner). Finally, the casting had to pass the initial leak test.

In all instances the porosity was determined to be caused from gas nucleation. Gas porosity has the characteristic of smooth side walls and with a hemispherical shape. It was determined that the locations of the porosity on all nine samples were within the gasket mating surface. The gasket surface is a portion of the datum A surface. The size of the porosity was measured for diameter and depth. The diameter to depth ratio ranged from 1.74 to 7.40. Information pertaining to the castings' identification and porosity classification is located in Table 1.

TABLE 1

Sample data for the restoration trial for cast iron with casting identification, porosity characterization and initial inspection on the restoration integrity.

| | Sample ID | | | Porosity Classification | | | | Post Restoration Testing | | |
|---|---|---|---|---|---|---|---|---|---|---|
| | HT code | serial # | L/R | location | gasket surface | diameter | depth | ratio | # passes to fill | complete fill | fall out after machining |
| 1 | 7L92 | 6481 | R | A-OFB | y | 0.1485 | 0.0515 | 2.88 | 4 | y | n (1 pass) |
| 2 | 8A157 | 7200 | R | A-OFB | y | 0.1755 | 0.074 | 2.37 | 2 | y | n (1, 2 pass) |
| 3 | 7L53 | 7189 | R | R. side | y | 0.1805 | 0.1035 | 1.74 | 2 | y | n (1, 2 pass) |
| 4 | 8A56 | 5868 | R | A-OFB | y | 0.065 | 0.01 | 6.50 | 1 | y (1st visual) | n (1 pass) |
| 5 | 8A97 | n/a | R | A-OFB | y | 0.074 | 0.01 | 7.40 | 1 | y (1st visual) | n (1 pass) |
| 6 | 8A47 | 5698 | L | A-OFB | y | 0.0815 | 0.033 | 2.47 | 1 | y (1st visual) | n (1 pass) |
| 7 | 8? | 7300 | R | A-OFB | y | 0.075 | 0.018 | 4.17 | 1 | y (1st visual) | n (1 pass) |
| 8 | 8A65 | 7315 | R | L. Side | y | 0.112 | 0.02 | 5.60 | 1 | y (1st visual) | n (1 pass) |
| 9 | ?72 | 5810 | L/R | A-OFB | y | 0.101 | 0.0155 | 6.52 | 1 | y (1st visual) | n (1 pass) |

The restoration spray gun settings used in this trial were an air pressure of 60 psi, a voltage range of 26 to 27 volts, and an amperage of 130 amps. The parameters for restoration of cast iron components are summarized in Table 2. A nickel alloy wire was selected because it has good bond strength with cast iron and low preparation time. Half of the cast components were bead blasted and half were restored as is. In both situations the spray filler had good penetration to the substrate material. Bead blasting was determined to be a non-value added step in the restoration of cast iron which results in a cycle time savings.

TABLE 2

Restoration parameters for lost foam cast iron components

| Restoration Parameters | |
|---|---|
| Air Pressure (psi) | 60 |
| Voltage (V) | 26 min-27 max |
| Amperage (Amps) | 130 |
| wire | Taffa 75B-95Ni 5Al 1-3 Mo |

Six of the nine components were successfully restored with a single pass, two of the nine restored filled with two passes, and one component required four passes. An identifiable cause could not be determined on why the one component took four passes to fill, since components with similar porosity shapes (diameter to depth ratios) were filled with one pass. The restoration areas were then machined to remove excess filler material. The restorations on all nine cast components were completely intact after the machining operation.

Cross-sectional analysis of the restoration areas demonstrated good bonding of the filler spray to the substrate. The build-up of the restoration layer was consistent.

Thus, the restoration process of the present application is a viable solution for correcting surface porosity defects on machined surfaces. The porosity was shown to be completely filled with minimal preparation and resulted in good bonding between the filler and the substrate materials. The restored surfaces provided an adequate seal for gasket surfaces for aluminum castings.

The above description describes what is believed to be the preferred embodiments of the present invention. However, those skilled in the art will recognize that other and further changes and modifications may be made thereto without departing from the spirit and scope of the invention, and it is intended to claim all such changes and modifications which fall within the true scope of the invention. Various other changes, modifications and/or alternatives may also be apparent to those of skill in the art. Such changes, modifications and alternatives are contemplated as being within the scope of the following claims which particularly point out and distinctly claim the subject matter regarded as the invention.

What is claimed is:

1. An in-line restoration process for repairing surface porosity defects in a cast component, the process comprising the steps of: identifying an area on a component surface containing at least one porosity defect resulting from the casting process, the area defining a restoration area; applying a restoration spray to said restoration area; and immediately finishing said restoration area, wherein the component surface and the restoration spray comprise distinct compositions.

2. The process of claim 1, wherein the component surface comprises a metallic substrate and the restoration spray comprises a metallic filler.

3. The process of claim 1, wherein the component surface comprises a metallic substrate and the restoration spray comprises a polymeric filler.

4. The process of claim 3, wherein the polymeric filler is a thermoplastic filler.

5. The process of claim 4, wherein the thermoplastic filler is a polyamide or polyphthalamide filler.

6. The process of claim 1, wherein the component surface comprises a polymeric substrate and the restoration spray comprises a metallic filler.

7. The process of claim 1, wherein the component surface comprises a polymeric substrate and the restoration spray comprises a polymeric filler.

8. The process of claim 7, wherein the polymeric filler is a thermoplastic filler.

9. The process of claim 8, wherein the thermoplastic filler is a polyamide or polyphthalamide filler.

10. The process of claim 1, wherein the component surface is cast iron or steel and the restoration spray comprises a nickel alloy or copper alloy.

11. The process of claim 10, wherein the nickel or copper alloy is based on the Ni—Cu binary system.

12. The process of claim 1 wherein said cast component is cast utilizing a lost foam casting process, a sand casting process, a die casting process or a permanent mold casting process.

13. The process of claim 1 wherein the step of applying a restoration spray further comprises applying the spray with a spray gun.

14. The process of claim 13 wherein the step of finishing the restoration area further comprises removing excess restoration spray material.

15. An in-line restoration process for repairing surface porosity defects on a sealing surface requiring zero porosity tolerance, the process comprising the steps of: identifying an area on a sealing surface containing at least one porosity defect, the area defining a restoration area; applying a restoration spray to said restoration area; and immediately finishing said restoration area.

16. The process of claim 15, wherein the sealing surface comprises a metallic substrate and the restoration spray comprises a separate, distinct metallic filler.

17. The process of claim 15, wherein the sealing surface comprises a metallic substrate and the restoration spray comprises a polymeric filler.

18. The process of claim 17, wherein the polymeric filler is a thermoplastic filler.

19. The process of claim 18, wherein the thermoplastic filler is a polyamide or polyphthalamide filler.

20. The process of claim 15, wherein the sealing surface comprises a polymeric substrate and the restoration spray comprises a polymeric filler.

21. The process of claim 20, wherein the polymeric filler is a thermoplastic filler.

22. The process of claim 21, wherein the thermoplastic filler is a polyamide or polyphthalamide filler.

23. The process of claim 15, wherein the sealing surface comprises a polymeric substrate and the restoration spray comprises a metallic filler.

24. The process of claim 16, wherein the sealing surface is cast iron and the restoration spray comprises a nickel alloy filler.

25. The process of claim 15 wherein the step of finishing the restoration area further comprises removing excess restoration spray material.

26. The process of claim 15 wherein the sealing surface is a mating surface that requires use of a gasket.

* * * * *